(12) United States Patent
Kamata et al.

(10) Patent No.: US 11,367,357 B2
(45) Date of Patent: Jun. 21, 2022

(54) TRAFFIC CONTROL APPARATUS, TRAFFIC CONTROL SYSTEM, TRAFFIC CONTROL METHOD, AND NON-TRANSITORY COMPUTER RECORDING MEDIUM

(71) Applicant: Toyota Jidosha Kabushiki Kaisha, Toyota (JP)

(72) Inventors: Nobuhide Kamata, Susono (JP); Yasuo Uehara, Gotemba (JP); Nozomu Hatta, Susono (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/709,450

(22) Filed: Dec. 10, 2019

(65) Prior Publication Data

US 2020/0193835 A1     Jun. 18, 2020

(30) Foreign Application Priority Data

Dec. 12, 2018   (JP) .................. 2018-232864

(51) Int. Cl.
| | |
|---|---|
| *G08G 1/00* | (2006.01) |
| *G08G 1/01* | (2006.01) |
| *B60W 30/09* | (2012.01) |
| *G08G 1/123* | (2006.01) |
| *G06Q 50/30* | (2012.01) |

(52) U.S. Cl.
CPC ............ *G08G 1/205* (2013.01); *B60W 30/09* (2013.01); *G08G 1/012* (2013.01); *G08G 1/123* (2013.01); *G08G 1/202* (2013.01); *G06Q 50/30* (2013.01)

(58) Field of Classification Search
CPC ........ G08G 1/205; G08G 1/202; G08G 1/012; G08G 1/123; B60W 30/09; G06Q 50/30
See application file for complete search history.

(56) References Cited

U.S. PATENT DOCUMENTS

| | | | | |
|---|---|---|---|---|
| 10,152,053 | B1* | 12/2018 | Smith ................. | G06Q 10/08 |
| 11,017,665 | B1* | 5/2021 | Roy ................... | G06Q 20/3224 |
| 2018/0214343 | A1* | 8/2018 | Cantor ................ | G16H 40/63 |
| 2019/0043364 | A1* | 2/2019 | Jumpertz ............. | G08G 1/0965 |
| 2019/0103028 | A1 | 4/2019 | Kobayashi et al. | |
| 2020/0058092 | A1* | 2/2020 | Buttolo ............... | G06Q 50/30 |

FOREIGN PATENT DOCUMENTS

| | | |
|---|---|---|
| JP | H10-207504 A | 8/1998 |
| JP | H10-241091 A | 9/1998 |
| JP | 2017-182137 A | 10/2017 |

* cited by examiner

*Primary Examiner* — James J Yang
(74) *Attorney, Agent, or Firm* — Dinsmore & Shohl LLP

(57) ABSTRACT

A control part of a traffic control apparatus preparing scheduled driving routes of a plurality of vehicles based on current positions and destinations of the plurality of vehicles received through a communicating part or receiving scheduled driving routes of the plurality of vehicles through the communicating part, judging if, among the plurality of vehicles, there are two or more close vehicles with projected times of driving or projected times of arrival in an area in which the scheduled driving routes overlap becoming the same time frame, and, when there are close vehicles, determining the driving/stopping priorities of the close vehicles in the area based on information relating to the passengers picked up in the respective close vehicles.

8 Claims, 4 Drawing Sheets

TRAFFIC CONTROL APPARATUS, TRAFFIC CONTROL SYSTEM, TRAFFIC CONTROL METHOD, AND NON-TRANSITORY COMPUTER RECORDING MEDIUM

CROSS-REFERENCE TO RELATED APPLICATIONS

This application claims priority to Japanese Patent Application No. 2018-232864 filed on Dec. 12, 2018, which is incorporated herein by reference in its entirety including the specification, drawings and abstract.

FIELD

The present disclosure relates to a traffic control apparatus, traffic control system, traffic control method, and non-transitory computer recording medium.

BACKGROUND

In recent years, development work has been proceeding on automated driving technology with an eye on realization of taxi, bus, rideshare, and other mobility services using automated driving vehicles automatically operated for driving. Japanese Unexamined Patent Publication No. 2017-182137 discloses as one such mobility service the technology relating to a car dispatch service for making an automated driving vehicle travel to a desired pickup point of a customer in response to a request for use of the customer and making the automated driving vehicle pick up the customer and transport him or her to the destination.

SUMMARY

Usually, automated driving vehicles drive along scheduled driving routes prepared based on the current position information and the destination information of the vehicle passengers etc. If the scheduled driving routes of automated driving vehicles overlap, sometimes the automated driving vehicles will drive in close proximity in the area in which the scheduled driving routes overlap or the automated driving vehicles will arrive in close proximity at the destinations of the endpoints of the scheduled driving routes. In such a case, sometimes it cannot necessarily be said to be desirable to allow a preceding vehicle to drive or stop with priority in the area in which the scheduled driving routes overlap.

The present disclosure was made focusing on such a problem point and has as its object to suitably determine the priority of driving or stopping of automated driving vehicles in an area in which the scheduled driving routes overlap in a case where there are two or more automated driving vehicles with projected times of driving or projected times of arrival in an area in which the scheduled driving routes overlap becoming the same time frame.

To solve the above problem, the traffic control apparatus according to one aspect of the present disclosure comprises a communicating part configured to be able to communicate with car-mounted devices mounted in a plurality of vehicles which are controlled to be automatically driven and a control part. Further, the control part is configured to prepare scheduled driving routes of the plurality of vehicles based on the current positions and destinations of the plurality of vehicles received through the communicating part or to receive scheduled driving routes of the plurality of vehicles through the communicating part, judge if, among the plurality of vehicles, there are two or more close vehicles with projected times of driving or projected times of arrival in an area in which the scheduled driving routes overlap becoming the same time frame, and, when there are close vehicles, determine the driving/stopping priorities of the close vehicles in the area in which the scheduled driving routes overlap based on information relating to passengers picked up by the respective close vehicles.

Further, the traffic control system according to another aspect of the present disclosure is provided with car-mounted devices mounted in a plurality of vehicles which are controlled to be automatically driven and a server connected to be able to communicate with the car-mounted devices through a network. Further, the car-mounted devices are configured to send the current positions and destinations of the plurality of vehicles to the server or send the scheduled driving routes of the plurality of vehicles prepared based on the current positions and destinations of the plurality of vehicles to the server. The server is configured to prepare scheduled driving routes of the plurality of vehicles based on the current positions and destinations of the plurality of vehicles received through the car-mounted devices or to receive scheduled driving routes of the plurality of vehicles through the car-mounted devices, judge if, among the plurality of vehicles, there are two or more close vehicles with projected times of driving or projected times of arrival in an area in which the scheduled driving routes overlap becoming the same time frame, and, when there are close vehicles, determine the driving/stopping priorities of the respective close vehicles in the area in which the scheduled driving routes overlap based on information relating to passengers picked up by the respective close vehicles.

Further, the traffic control method according to one aspect of the present disclosure comprises preparing scheduled driving routes of a plurality of vehicles which are controlled to be automatically driven based on current positions and destinations of the plurality of vehicles received through a communicating part configured to be able to communicate with car-mounted devices mounted in the plurality of vehicles or receiving scheduled driving routes of the plurality of vehicles through the communicating part, judging if, among the plurality of vehicles, there are two or more close vehicles with projected times of driving or projected times of arrival in an area in which the scheduled driving routes overlap becoming the same time frame, and, when there are close vehicles, determining the driving/stopping priorities of the close vehicles in the area based on information relating to passengers picked up by the respective close vehicles.

Further, the non-transitory computer recording medium according to one aspect of the present disclosure includes a computer program for traffic control use for making a computer prepare scheduled driving routes of a plurality of vehicles controlled to be automatically driven based on current positions and destinations of the plurality of vehicles received through a communicating part configured to be able to communicate with car-mounted devices mounted in the plurality of vehicles or receive scheduled driving routes of the plurality of vehicles through the communicating part, judge if, among the plurality of vehicles, there are two or more close vehicles with projected times of driving or projected times of arrival in an area in which the scheduled driving routes overlap becoming the same time frame, and, when there are close vehicles, determine the driving/stopping priorities of the close vehicles in the area based on information relating to passengers picked up by the respective close vehicles.

According to these aspects of the present disclosure, it is possible to suitably determine the priority of driving or stopping of automated driving vehicles in an area in which the scheduled driving routes overlap in a case where there are two or more automated driving vehicles with projected times of driving or projected times of arrival in an area in which the scheduled driving routes overlap becoming the same time frame.

DESCRIPTION OF EMBODIMENTS

Figure 1:
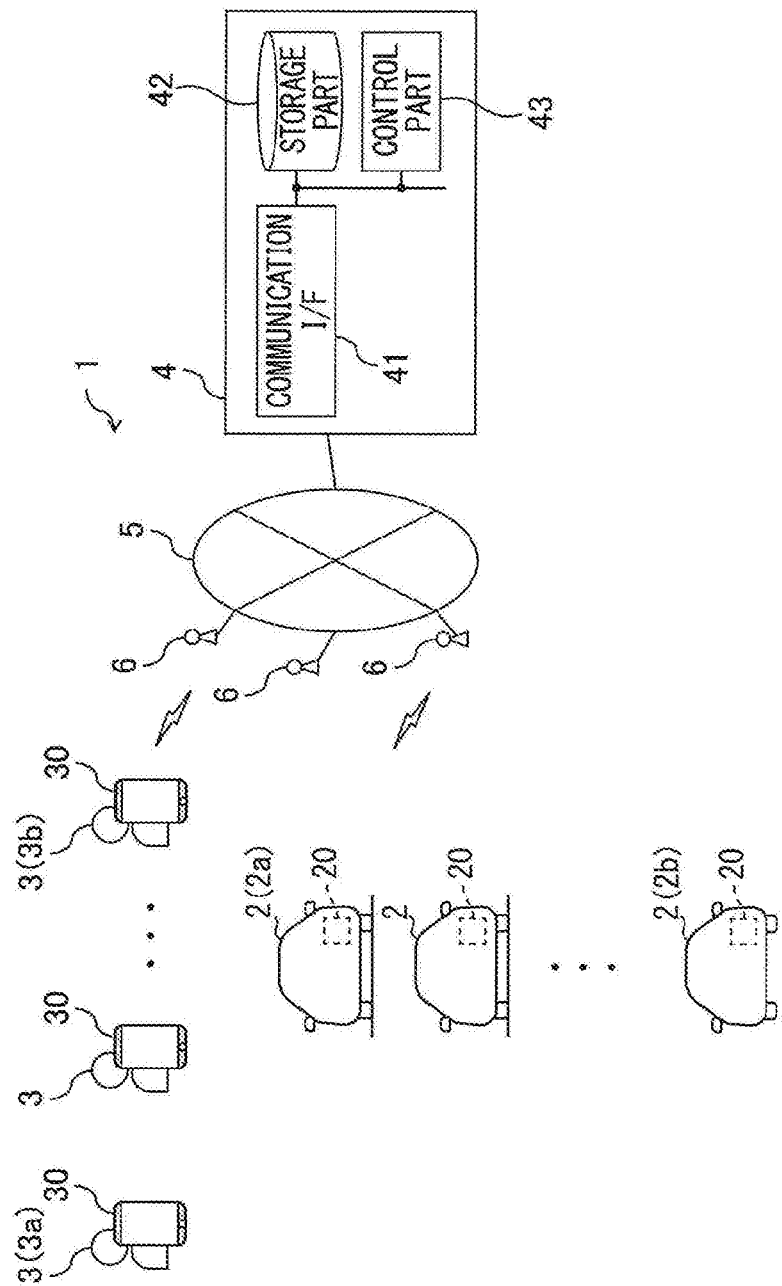
FIG. 1 is a schematic view of a configuration of a car dispatch system according to one embodiment of the present disclosure.

Below, referring to the drawings, embodiments of the present disclosure will be explained in detail. Note that, in the following explanation, similar component elements are assigned the same reference notations.

FIG. 1 is a view of a schematic configuration of a traffic control system 1 according to one embodiment of the present disclosure.

The traffic control system 1 according to the present embodiment is provided with car-mounted devices 20 mounted in a plurality of vehicles 2 which are controlled to be automatically driven and a server 4 as one example of a traffic control apparatus. Each vehicle 2 according to the present embodiment is, for example, an automated driving vehicle providing a taxi, bus, rideshare, or other car dispatch service. The plurality of the customers 3 utilizing the car dispatch service respectively have mobile terminals 30.

The car-mounted devices 20, mobile terminals 30, and server 4 are able to communicate with each other through a network 5 comprised of optical communication lines etc. The car-mounted devices 20 and mobile terminals 30 are, for example, connected with the network 5 through a wireless base station 6 etc. Further, the server 4 is, for example, connected with the network 5 through a not shown gateway etc.

Figure 2:
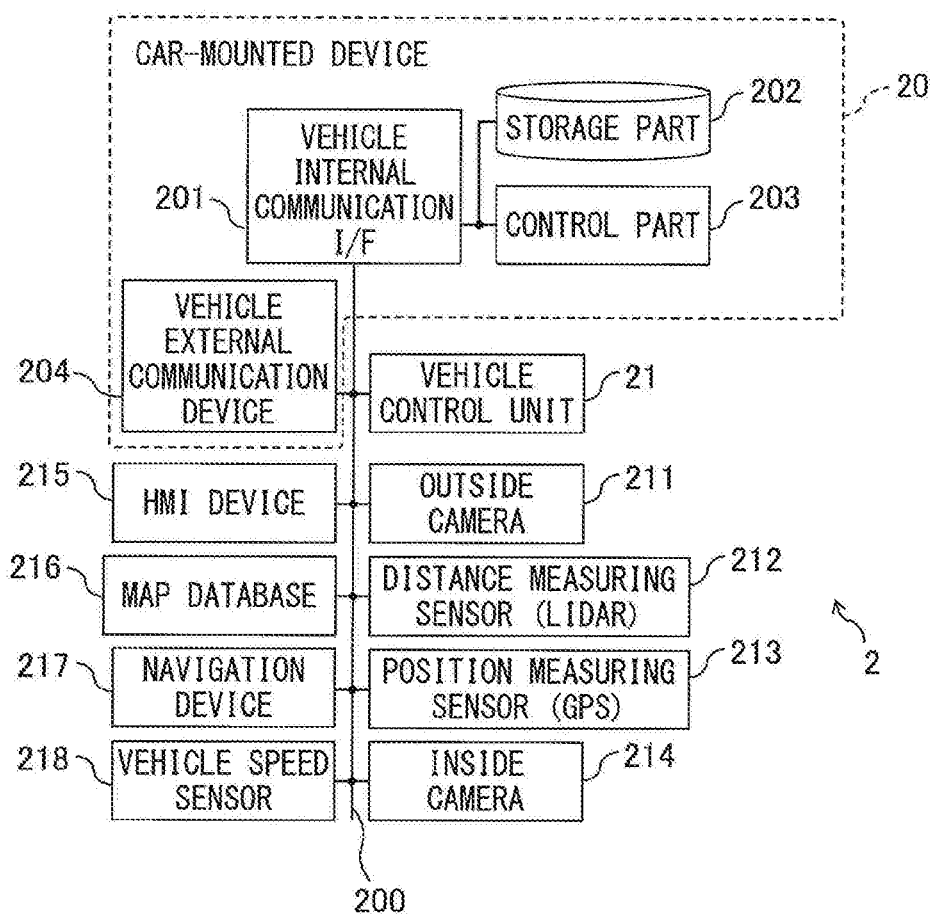
FIG. 2 is a view of a hardware configuration of a vehicle according to one embodiment of the present disclosure.

FIG. 2 is a view of a hardware configuration of a vehicle 2.

As shown in FIG. 2, each vehicle 2 is provided with components connected with each other through an internal network 200 such as the car-mounted device 20, a vehicle control unit 21, outside camera 211, distance measuring sensor 212, position measuring sensor 213, inside camera 214, HMI (Human Machine Interface) device 215, map database 216, navigation device 217, and vehicle speed sensor 218. The internal network 200, for example, is made a network based on the CAN (Controller Area Network) standard.

Each car-mounted device 20 is provided with components connected with each other through signal wires such as an internal communication interface (below, referred to as the "internal communication I/F") 201, a storage part 202, and a control part 203. Further, each car-mounted device 20 is provided with an external communication device 204 connected to the internal communication I/F 201 through the internal network 200.

The internal communication I/F 201 is a communication I/F circuit for the car-mounted device 20 to communicate with the external communication device 204 and the other car-mounted equipment of the vehicle 2 (for example outside camera 211 etc.) through the internal network 200.

The storage part 202 has an HDD (Hard Disk Drive), optical storage medium, or semiconductor memory or other storage medium and stores a computer program to be run at the control part 203. Further, the storage part 202 stores data generated by the control part 203 and data which the control part 203 receives through the internal network 200 from the external communication device 204 and other car-mounted equipment of the vehicle 2.

The control part 203 can be made one or more processors for running a computer program for control and processing in the car-mounted device 20 and their peripheral circuits.

The external communication device 204 is a car-mounted terminal having a wireless communication function. The external communication device 204, for example, accesses the wireless base station 6 connected with the network 5 through a not shown gateway etc. to thereby be connected through the wireless base station 6 to the network 5. Due to this, it communicates with the server 4. Further, the external communication device 204 is designed to utilize Wi-Fi® or Bluetooth® or other near field communication to be able to communicate with the mobile terminals 30 of the customers 3.

The vehicle control unit 21 automatically performs driving operations relating to acceleration, steering, and braking so that the vehicle 2 is automatically driven along a driving route prepared by the navigation device 217 based on signals output from the outside camera 211, distance measuring sensor 212, position measuring sensor 213, inside camera 214, etc.

The outside camera 211 captures and outputs a video of the surroundings of the vehicle 2. The video captured by the outside camera 211 is utilized by the vehicle control unit 21 for automatically controlling the operation of the vehicle 2. The outside camera 211 is arranged for example near the front glass of the vehicle 2 with the imaging surface facing the outside of the vehicle so that objects and people in the surroundings of the vehicle 2 are clearly captured.

The distance measuring sensor 212 measures the distance to an object present in the surroundings of the vehicle 2 for each orientation. The distance information measured by the distance measuring sensor 212 is similarly utilized by the vehicle control unit 21 for automatically controlling the operation of the vehicle 2. The distance measuring sensor 212 is, for example, made a LiDAR (Light Detection And Ranging) device installed at the vehicle 2.

The position measuring sensor 213 generates and outputs current position information showing the current location of the vehicle 2. The current position information of the vehicle 2 generated by the position measuring sensor 213 is utilized by the vehicle control unit 21 for automatically controlling the operation of the vehicle 2 and also is sent through the network 5 from the car-mounted device 20 (more particularly the external communication device 204) to the server 4 so that the server 4 can obtain a grasp of the current position of the vehicle 2. The position measuring sensor 213 is, for example, made a GPS (Global Positioning System) installed at the vehicle 2.

The inside camera 214 captures video of the inside of the car and outputs it to the car-mounted device 20 and the vehicle control unit 21. The video captured by the inside camera 214 is utilized for the car-mounted device 20 to sense a customer 3 being picked up by the vehicle 2 or being dropped off from the vehicle 2. A plurality of inside cameras 214 may be arranged inside the car. An inside camera 214 is, for example, arranged at the ceiling of the vehicle 2 etc. so that a customer 3 inside the car is clearly captured.

The HMI device 215 is configured to enable information to be traded between the car-mounted device 20 of the vehicle 2 and the customer 3 of the vehicle 2. The HMI device 215 according to the present embodiment is provided with a display as an information display screen arranged at a position which the customer 3 of the vehicle 2 can view and a touch panel as an operating device for the customer 3 of the vehicle 2 to perform entry operations and response operations. The customer 3 can be shown various types of information (for example, text information or graphic information) on the display.

The map database 216 is a database relating to map information. The map database 216, for example, is stored in a hard disk drive (HDD) mounted in the vehicle 2. The map information includes position information of the roads and information on the road shapes (for example, curved or straight type, curvature of curve, etc.), position information of intersections and turnoffs, road types, and other information.

The navigation device 217 refers to the map information of the map database 216 and prepares and outputs a driving route to a destination based on the current position of the vehicle 2 detected by the position measuring sensor 213 and the desired pickup point and destination of the customer 3 picked up by the vehicle 2.

The vehicle speed sensor 218 measures and outputs the speed of the vehicle 2. The speed of the vehicle 2 measured by the vehicle speed sensor 218 is utilized by the vehicle control unit 21 for automatically controlling the operation of the vehicle 2 and also is utilized by the car-mounted device 20 to calculate a projected time of driving of when the vehicle 2 drives through points on the driving route or a projected time of arrival when it arrives at the destination of the endpoint of the driving route.

Returning to FIG. 1, the server 4 has components connected with each other through signal wires such as a communication interface (below, referred to as the "communication I/F") 41, the storage part 42, and the control part 43.

The communication I/F 41 is one example of a communicating part and is a communication I/F circuit for connecting the server 4 to the network 5 through for example a gateway etc. The communication I/F 41 is configured to be able to communicate with the car-mounted devices 20 of the vehicles 2 (more particularly the external communication devices 204) and mobile terminals 30 through the network 5.

The storage part 42 has an HDD (Hard Disk Drive), optical storage medium, or semiconductor memory or other storage medium and stores a computer program run by the control part 43. Further, the storage part 42 stores data generated by the control part 43, data received by the control part 43 through the network 5, etc.

Further, the storage part 42 stores, as one example of information relating to the vehicles 2, identification information of the vehicles 2, their car models and other information. The identification information of the vehicles 2 includes, for example, the license plate numbers of the vehicles 2, identification numbers displayed on the door surfaces etc. of the vehicles 2, etc. Furthermore, the storage part 42 stores, as one example of information relating to the customers 3, identification information of the customers 3, their addresses, ages, and other information. The identification information of the customers 3, for example, are customer numbers assigned to the customers 3 utilizing the car dispatch service.

The control part 43 can be made one or more processors for running a computer program for control or processing of the later explained traffic control processing etc. at the server 4 and their peripheral circuits.

The control part 43 receives a car dispatch request sent from a mobile terminal 30 of one customer 3a trying to utilize a car dispatch service through the communication i/F 41. If so, it determines the vehicle 2a (responding vehicle) for picking up the customer 3 requesting car dispatch from the plurality of the vehicles 2 and sends the car-mounted device 20 of the vehicle 2a a car dispatch instruction through the communication I/F 41.

Further, if the car-mounted device 20 of the vehicle 2a receives a car dispatch instruction through the external communication device 204, the vehicle control unit 21 is used to make the vehicle 2a be automatically driven to make the vehicle 2a travel to the desired pickup point of the customer 3a to pick up the customer 3a, then make the vehicle 2 travel to the destination of the customer 3a. Specifically, the car-mounted device 20 of the vehicle 2a uses the vehicle control unit 21 to make the vehicle 2a be automatically driven and make the vehicle 2a travel to the destination of the customer 3a along the scheduled driving route to the destination prepared based on the current position information of the vehicle 2a and the destination information of the customer 3a picked up by the vehicle 2a etc.

Here, sometimes the scheduled driving route of the vehicle 2a and the scheduled driving route of a vehicle 2b which has picked up another customer 3b overlap and, at the area in which the scheduled driving routes overlap, the projected times of driving on the scheduled driving routes of the vehicles 2a, 2b or the projected times of arrival at the destinations of end points of the scheduled driving routes will become the same time frame.

If the projected times of driving of the vehicles 2a, 2b at the area in which the scheduled driving routes overlap become the same time frame, for example, a situation will occur in which the vehicles 2a, 2b drive on a road comprised of two lanes on each side heading in the same direction in close proximity. For a provider of a car dispatch service, if such a situation arises, even if the vehicle 2a is driven behind the vehicle 2b, it would sometimes be possible to improve the customer service of the car dispatch service by making the vehicle 2a drive on the passing lane etc. to give priority to driving of the vehicle 2a.

Further, if the projected times of arrival of the vehicles 2a, 2b at the area in which the scheduled driving routes overlap become the same time frame, for example, a situation will occur in which the vehicles 2a, 2b, for example, arrive at the same drop-off point desired by the customers 3a, 3b of the vehicles 2a, 3b in close proximity. For a provider of a car dispatch service, if such a situation arises, even if the vehicle 2a reaches the drop-off point desired by the customers 3a, 3b after the vehicle 2b, it would sometimes be possible to improve the customer service of the car dispatch service by making the vehicle 2a stop at the drop-off point desired by the customer 3a with priority to drop off the customer 3a.

Examples of a case where comparing the vehicle 2a and the vehicle 2b, giving priority to driving and stopping of the vehicle 2a would enable the customer service of the car dispatch service to be improved include the case where the number of passengers of the vehicle 2a is greater than the number of passengers of the vehicle 2b or where the customer 3a of the vehicle 2a is additionally billed a service charge other than the car dispatch service charge by the provider of the car dispatch service or where the destination of the customer 3a of the vehicle 2a is for example a hospital or the police or other specific facility where it is believed urgency is required etc.

By giving priority to driving or stopping of a vehicle 2 with a greater number of passengers in this way, it is possible to make the vehicle 2 with the greater number of passengers arrive at the destination earlier or make it drop off the passengers at the drop-off point as desired, so it is possible to satisfy a greater number of customers 3a and improve the customer service of the car dispatch service.

Further, by giving priority to driving or stopping of a vehicle 2 picking up a customer 3 additionally billed a service charge besides the car dispatch service charge, it is possible to provide a service commensurate with the service charge, possible to increase the degree of satisfaction of a customer 3 paying a greater service charge, and keep a customer 3 not paying the service charge from feeling dissatisfied.

Furthermore, by giving priority to driving or stopping of a vehicle picking up a customer 3 whose destination is a hospital or the police or other specific facility, it is possible to allow a customer 3 believed to be in a situation requiring urgency to reach the specific facility earlier or allow him or her to be dropped off at the drop-off point as desired (that is, at a drop-off point closer to the specific facility), so the customer 3 believed to be in a situation requiring urgency can be satisfied and the customer service of the car dispatch service can be improved.

Therefore, in the present embodiment, it is judged if there are two or more vehicles 2 with projected times of driving or projected times of arrival in an area in which the scheduled driving routes overlap becoming the same time frame among a plurality of vehicles 2 (below, referred to as "close vehicles") and, when there are close vehicles 2, the driving/stopping priorities of the respective close vehicles 2 in the area in which the scheduled driving routes overlap are determined based on information relating to the passengers picked up by the respective close vehicle 2 (for example, information relating to the number of passengers, information on additional billing of a service charge besides the car dispatch service charge, destination information, etc.). Further, in the area in which the scheduled driving routes overlap, priority is given to driving or stopping of a vehicle 2 with a high driving/stopping priority.

Figure 3:
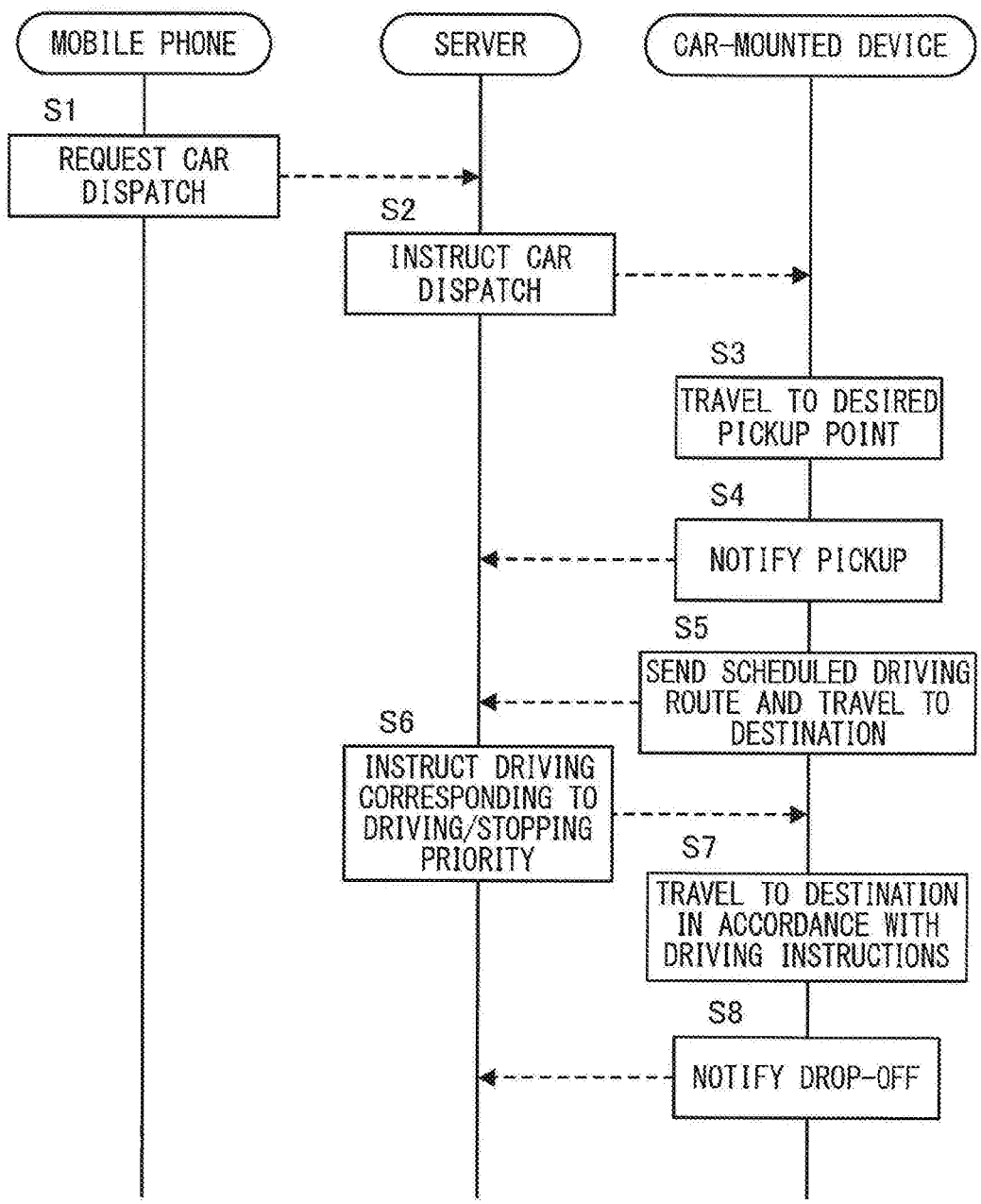
FIG. 3 is a sequence diagram showing one example of traffic control processing according to one embodiment of the present disclosure.

FIG. 3 is a sequence diagram showing one example of traffic control processing according to the present embodiment. In the sequence diagram shown in FIG. 3, communication between the server 4 and a car-mounted device 20 of a vehicle 2 and mobile terminal 30 is performed through the network 5.

At step S1, one customer 3a among a plurality of customers 3 operates a mobile terminal 30 which he or she has so as to send a car dispatch request to the server 4. The car dispatch request includes not only the fact of request of car dispatch, but also identification information of the customer 3a, the desired pickup point, the destination, the desired drop-off point, the number of accompanying passengers besides the customer 3a, the presence of any additional billing, and other information relating to the customer 3. The current location of the customer 3a, the desired pickup point, the destination, and the desired drop-off point are, for example, designated by the name of the facility, address, or combination of the latitude and longitude.

At step S2, the server 4 receiving the car dispatch request searches for vehicles 2 present within a certain distance from the desired pickup point of the customer 3a, selects at least one vehicle 2a able to be utilized from the vehicles 2 which are found as the responding vehicle of the customer 3a, and sends a car dispatch instruction to the car-mounted device 20 of the vehicle 2a selected as the responding vehicle so as to make it head toward the desired pickup point of the customer 3a. The dispatch instruction includes information relating to the customer 3a contained in the car dispatch request of the customer 3a.

At step S3, the car-mounted device 20 of the vehicle 2a receiving the car dispatch instruction uses the vehicle control unit 21 to make the vehicle 2a automatically drive and make the vehicle 2a travel to the desired pickup point of the customer 3a. Note that the car-mounted device 20 periodically sends the server 4 position information showing the current location of the vehicle 2a and vehicle speed information while the vehicle 2a is being automatically driven by the vehicle control unit 21.

At step S4, the car-mounted device 20 of the vehicle 2a traveling to the desired pickup point of the customer 3a communicates with the mobile terminal 30 of the customer 3a by for example near field communication to confirm the customer 3a is the one making the car dispatch request (matching), then permits pickup of the customer 3a. Further, if the car-mounted device 20 of the vehicle 2a confirms the customer 3a has been picked up by, for example, door opening/closing operation or the inside camera 214, it sends a pickup notification to the server 4.

At step S5, the car-mounted device 20 of the vehicle 2a picking up the customer 3a uses a navigation device 217 mounted in the vehicle 2a to prepare a scheduled driving route based on the current location of the vehicle 2a and the destination or desired drop-off point or other information of the customer 3a contained in the car dispatch instruction. Further, the car-mounted device 20 sends the prepared scheduled driving route to the server 4, instructs the vehicle control unit 21 for automatic driving in accordance with the prepared scheduled driving route, and makes the vehicle 2a travel to the destination of the customer 3a. Note that, the scheduled driving route of the vehicle 2a may also be prepared at the server 4 and sent to the car-mounted device 20 of the vehicle 2a.

At step S6, the server 4 searches among the plurality of the vehicles 2 for any one or more other vehicles 2 having scheduled driving routes overlapping the scheduled driving route of the vehicle 2a. Further, if there are other vehicles 2 with scheduled driving routes overlapping the vehicle 2a, the server 4 further searches among them for any other vehicles 2 which may be driving through an area in which the scheduled driving routes overlap at the same time frame as the vehicle 2a or may arrive at an area in which the scheduled driving routes overlap at the same time frame as the vehicle 2a based on the current position information and vehicle speed information of the vehicles 2.

Further, when there are one or more other vehicles 2 with projected times of driving or projected times of arrival in the area in which the scheduled driving routes overlap becoming the same time frame as the vehicles 2a, the server 4 acquires from the information relating to the customers 3 of the close vehicles 2, including the vehicle 2a, information relating to the passengers picked up by the close vehicles 2 (for example, information relating to the number of passengers, information of additional billing of a service charge besides the car dispatch service charge, destination information, etc.). Further, based on the information relating to the passengers picked up by the close vehicles 2, the server 4 determines the driving/stopping priorities of the close vehicles 2 and sends driving instructions corresponding to the driving/stopping priorities to the car-mounted devices 20 of the close vehicles 2.

For example, the server 4 sends the car-mounted device 20 of a vehicle 2 with a high driving/stopping priority an instruction for making it drive on a passing lane in an area in which the scheduled driving routes overlap and sends the car-mounted device 20 of a vehicle 2 with a low driving/stopping priority an instruction for making it drive on the cruising lane so as to give priority to driving of the vehicle 2 with the high driving/stopping priority. Further, for example, the server 4 sends an instruction to the car-mounted device 20 of the vehicle 2 with a high driving/stopping priority in the area in which the scheduled driving routes overlap to make it stop at the drop-off position desired by the customer 3 of the vehicle 2 and sends an instruction to the car-mounted device 20 of the vehicle 2 with a low driving/stopping priority to make it stop near the drop-off position desired by the customer 3 of the vehicle 2 to thereby give priority to stopping at the drop-off position desired by the customer 3 of the vehicle 2 with the high driving/stopping priority.

At step S7, when receiving driving instructions corresponding to the driving/stopping priorities from the server 4 while traveling to the destination, the car-mounted device 20 of the vehicle 2a instructs the vehicle control unit 21 so as to automatically drive in accordance with the driving instructions.

At step S8, the car-mounted device 20 of the vehicle 2a traveling to the destination of the customer 3a makes the vehicle 2a stop to make it drop off the customer 3a. Further, if the car-mounted device 20 of the vehicle 2 confirms that the customer 3a has been dropped off by, for example, door operation or the inside camera 214, it sends a drop-off notification to the server 4.

Figure 4:
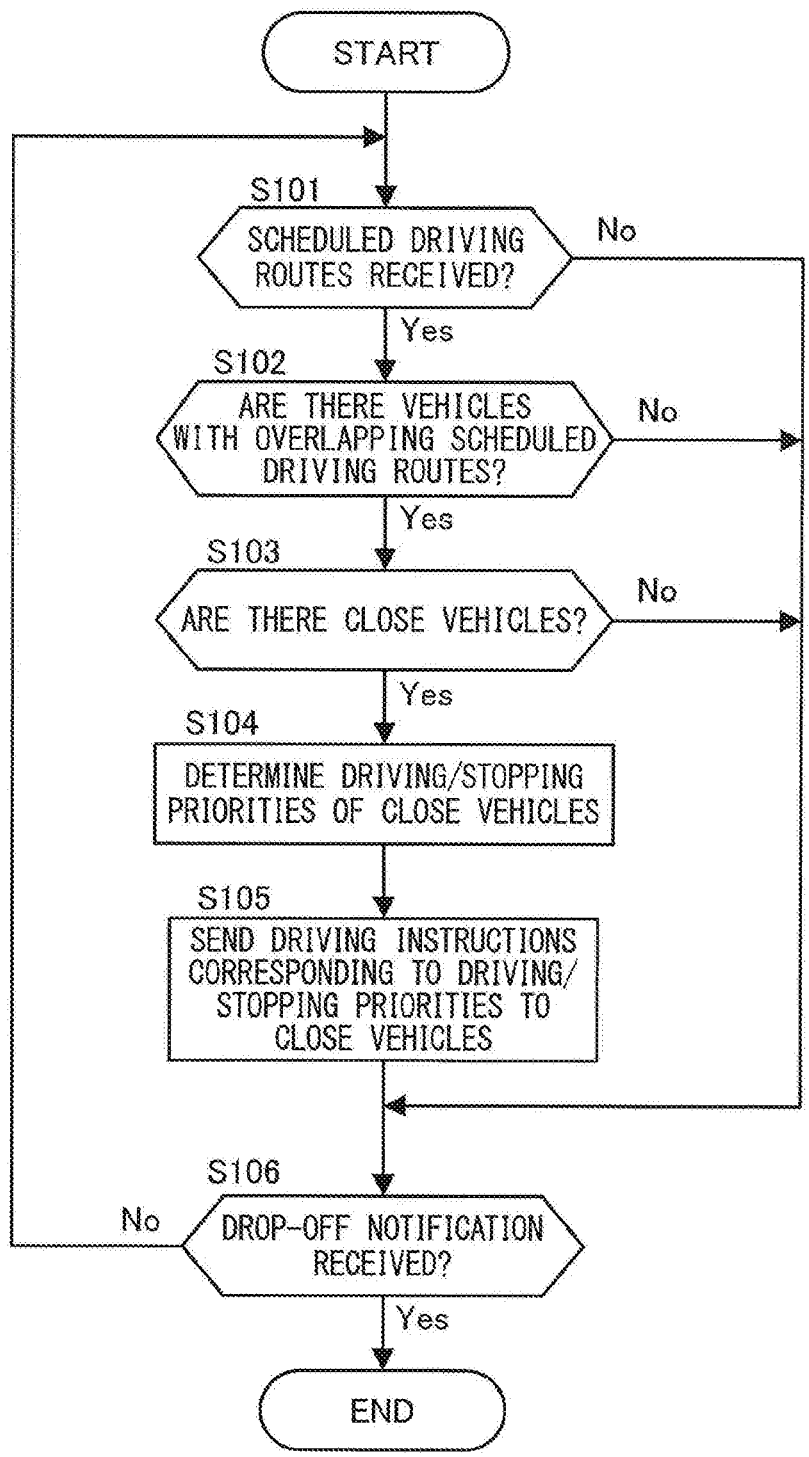
FIG. 4 is a flow chart explaining a part relating to traffic control processing according to one embodiment of the present disclosure in processing performed at a server.

FIG. 4 is a flow chart for explaining parts relating to the traffic control processing according to the present embodiment in the processing performed at the server 4 (in more detail, the control part 43 of the server 4). The server 4 performs the present routine if receiving a car dispatch request of the vehicle 2 from the mobile terminal 30 of the customer 3a, then receiving a pickup notification from the car-mounted device 20 of the vehicle 2a selected as the responding vehicle.

At step S101, the server 4 judges if the scheduled driving route of the vehicle 2a has been received from the car-mounted device 20 of the vehicle 2a. The server 4 proceeds to the processing of step S102 if receiving the scheduled driving route of the vehicle 2a. On the other hand, the server 4 proceeds to the processing of step S106 if not receiving the scheduled driving route of the vehicle 2a.

Note that, when, at this step S101, receiving the current position information and the destination information of the vehicle 2a from the car-mounted device 20 of the vehicle 2a, the server 4 side may also prepare the scheduled driving route of the vehicle 2a based on these information, send it to the car-mounted device 20 of the vehicle 2a, and then proceed to the processing of step S102. Further, if not receiving the current position information and the destination information of the vehicle 2a from the car-mounted device 20 of the vehicle 2a, the routine may proceed to the processing of step S106.

At step S102, the server 4 searches from among the plurality of the vehicles 2 for whether there are one or more other vehicles 2 having scheduled driving routes overlapping with the scheduled driving route of the vehicle 2a. If there are other vehicles 2 having scheduled driving routes overlapping with the scheduled driving route of the vehicle 2a, the server 4 proceeds to the processing of step S103. On the other hand, if there are no other vehicles 2 having scheduled driving routes overlapping with the scheduled driving route of the vehicle 2a, the server 4 proceeds to the processing of step S106.

At step S103, based on the current position information and vehicle speed information of the vehicle 2a and the respective other vehicles 2 having scheduled driving routes overlapping with the scheduled driving route of the vehicle 2a, the server 4 searches from among the other vehicles 2 having scheduled driving routes overlapping with the scheduled driving route of the vehicle 2a for any other vehicle 2 which may be driving through an area with a scheduled driving route overlapping the vehicle 2a at the same time frame as the vehicle 2a or arriving at the area with a scheduled driving route overlapping the vehicle 2a at the same time frame as the vehicle 2a.

That is, the server 4 judges if there are two or more close vehicles 2 including the vehicle 2a with projected times of driving or projected times of arrival in the area at which the scheduled driving routes overlap becoming the same time frame as the vehicle 2a. The server 4 proceeds to the processing of step S104 if there are such close vehicles 2 and proceeds to the processing of step S106 if there are not.

At step S104, the server 4 acquires information relating to the passengers picked up by the close vehicles 2 (for example, information relating to the number of passengers, information on billing of an additional service charge besides the car dispatch service charge, destination information, etc.) from the information relating to the customers 3 of the close vehicles 2 including the vehicle 2a and determines the driving/stopping priorities of the respective close vehicles 2 in the area in which the scheduled driving routes overlap based on information relating to the passengers picked up by the close vehicles 2.

At step S105, the server 4 sends the car-mounted devices 20 of the close vehicles 2 including the vehicle 2a driving instructions corresponding to the determined driving/stopping priorities.

At step S106, the server 4 judges if it has received a drop-off notification from the car-mounted device 20 of the vehicle 2a notifying it that the customer 3a has been dropped off from the vehicle 2a. The server 4 ends the present routine if receiving a drop-off notification. On the other hand, the server 4 performs the processing of step S101 again after a certain time interval if still not receiving a drop-off notification.

The server 4 (traffic control apparatus) according to the present embodiment explained above is comprised of a communicating part 41 configured to be able to communicate with car-mounted devices 20 mounted in a plurality of vehicles 2 controlled to be automatically driven and a control part 43. Further, the control part 43 is configured to prepare scheduled driving routes of the plurality of vehicles 2 based on the current positions and destinations of the plurality of the vehicle 2 received through the communicating part 41 or receive the scheduled driving routes of the plurality of vehicles 2 through the communicating part 41 and judge if among the plurality of vehicles 2 there are two or more close vehicles 2 with projected times of driving or projected times of arrival in the area in which the scheduled driving routes overlap becoming the same time frame and, when there are close vehicles 2, determine the driving/stopping priorities of the respective close vehicles 2 in the area in which the scheduled driving routes overlap based on information relating to the passengers picked up by the respective close vehicles 2.

Due to this, if there are two or more vehicles 2 controlled to be automatically driven with projected times of driving or projected times of arrival at an area in which the scheduled driving routes overlap becoming the same time frame, it is possible to suitably decide the priorities of driving or stopping of the vehicles 2 in the area in which the scheduled driving routes overlap based on information relating to the passengers picked up by the vehicles 2.

In more detail, the control part 43 is configured to send driving instructions to the car-mounted devices 20 of the respective close vehicles 2 through the communicating part 41 so as to make the vehicle 2 with the higher driving/stopping priority among the close vehicles 2 drive with greater priority through the area in which the scheduled driving routes overlap or make it stop with greater priority at the area in which the scheduled driving routes overlap.

Due to this, it is possible to make the vehicle 2 with the high driving/stopping priority drive with greater priority in the area in which the scheduled driving routes overlap, so it is possible to make the vehicle 2 with the high driving/stopping priority arrive at the destination earlier and further make it stop at the drop-off point and drop off the customer 3 as desired.

As information relating to the passengers picked up by the respective close vehicles 2, for example, it is possible to use the number of passengers picked up by the respective close vehicles 2. In this case, the control part 43 is configured to raise the driving/stopping priority the greater number of passengers in a vehicle among the close vehicles 2.

By making a vehicle 2 with a greater number of passengers drive or stop with greater priority in this way, it is possible to make a vehicle 2 with a greater number of passengers arrive at a destination earlier or drop them off at the drop-off point as desired, so it is possible to satisfy a greater number of customers 3a and improve the customer service of the car dispatch service.

Further, as information relating to the passengers picked up by the respective close vehicles, for example, information on billing of an additional service charge besides the car dispatch service charge paid by the passengers picked up by the respective close vehicles 2 can be used. In this case, the control part 43 is configured to raise the driving/stopping priority of the vehicle 2 picking up customers 3 billed with greater additional service charges other than the car dispatch service charge among the close vehicles 2.

In this way, by giving greater priority to driving or stopping of a vehicle 2 in which a customer 3 is picked up who is billed an additional service charge besides the car dispatch service charge, it is possible to provide customer service commensurate with the service charge. For this reason, it is possible to increase the degree of satisfaction of a customer 3 paying a higher service charge and possible to keep a customer 3 not paying a service charge from feeling dissatisfied.

Further, as information relating to the passengers picked up by the respective close vehicles, for example, information relating to the destinations of the passengers picked up by the respective close vehicles 2 can be used. In this case, the control part 43 is configured so as to raise the driving/stopping priority of the vehicle 2 among the close vehicles 2 with a destination of a preset hospital or police or other specific facility.

By giving priority to driving or stopping of a vehicle 2 picking up a customer 3 traveling to the hospital, police, or other specific facility in this way, it is possible to make a customer 3 believed to be in a situation requiring urgency reach the specific facility earlier and drop him or her off at the drop-off point as desired (that is, a drop-off point closer to the specific facility), so it is possible to satisfy a customer 3 believed to be in a situation requiring urgency and improve the customer service of the car dispatch service.

Above, embodiments of the present disclosure were explained, but the above embodiments only show some of the examples of application of the present disclosure and are not meant to limit the technical scope of the present disclosure to the specific constitutions of the above embodiments.

For example, in the above embodiments, if there is one vehicle 2 with areas where the scheduled driving route overlaps with other vehicles 2 at a plurality of points, it is expected that the driving/stopping priority of the one vehicle 2 will become lower each time at each area. In such a case, since that one vehicle 2 will allow other vehicles 2 to drive with greater priority each time in those areas, the customer 3 of that one vehicle 2 is liable to feel dissatisfied. Therefore, if there is a vehicle 2 allowing other vehicles 2 to drive with greater priority a predetermined number of times or more, it is possible to make the driving/stopping priority of that vehicle 2 highest.

The invention claimed is:

1. A traffic control apparatus comprising:
a communicating part configured to be able to communicate with car-mounted devices mounted in a plurality of vehicles controlled to be automatically driven; and
a control part, wherein
the control part is configured to:
  prepare scheduled driving routes of the plurality of vehicles based on current positions and destinations of the plurality of vehicles received through the communicating part or to receive scheduled driving routes of the plurality of vehicles through the communicating part;
  judge that, among the plurality of vehicles, there are two or more close vehicles when a first close vehicle traveling a first scheduled driving route and a second close vehicle traveling a second scheduled driving route will overlap on a roadway or at a point of interest at the same time; and,
  when it is judged that there are two or more close vehicles, determine the driving/stopping priorities of the two or more close vehicles on the roadway or at the point of interest based on information relating to passengers picked up by the respective two or more close vehicles; and
  send instructions to a lower priority vehicle to yield to allow a higher priority vehicle to proceed with priority to avoid interference between the first close vehicle and the second close vehicle, wherein:
  the information relating to the passengers picked up by the respective two or more close vehicles is a number of passengers picked up by the respective two or more close vehicles,
  the control part is further configured so that the greater the number of passengers of a vehicle among the two or more close vehicles, the higher the driving/stopping priority is made, and the control part is further configured to increase the driving/stopping priority of the lower priority vehicle when the lower priority vehicle yields to higher priority vehicles a predetermined number of times.

2. The traffic control apparatus according to claim 1, wherein:
the control part is further configured to send driving instructions to the car-mounted devices of the respective two or more close vehicles through the communicating part so that the higher the driving/stopping priority of a vehicle among the two or more close vehicles, the greater the priority by which it is driven through the roadway or point of interest or the greater the priority by which it is made to stop on the roadway or at the point of interest.

3. The traffic control apparatus according to claim 1, wherein:
the information relating to the passengers picked up by the respective two or more close vehicles is information on billing of an additional service charge besides a car dispatch service charge paid by the passengers picked up by the respective two or more close vehicles, and
the control part is further configured so that the greater the amount of the billing of an additional service charge besides the car dispatch service charge paid by the passengers, the higher the driving/stopping priority is made.

4. The traffic control apparatus according to claim 1, wherein:
the information relating to the passengers picked up by the respective two or more close vehicles is information relating to the destinations of the passengers picked up by the respective two or more close vehicles, and
the control part is further configured so that the driving/stopping priority of a vehicle with a destination of a preset specific facility among the two or more close vehicles is made higher.

5. The traffic control apparatus according to claim 4, wherein:
the specific facility is a hospital or the police.

6. A traffic control system comprising:
car-mounted devices mounted in a plurality of vehicles which are controlled to be automatically driven; and
a server connected to be able to communicate with the car-mounted devices through a network, wherein
the car-mounted devices are configured to send current positions and destinations of the plurality of vehicles to the server or send scheduled driving routes of the plurality of vehicles prepared based on the current positions and destinations of the plurality of vehicles to the server, and
the server is configured to:
prepare scheduled driving routes of the plurality of vehicles based on the current positions and destinations of the plurality of vehicles received through the car-mounted devices or to receive the scheduled driving routes through the car-mounted devices;
judge that, among the plurality of vehicles, there are two or more close vehicles when a first close vehicle traveling a first scheduled driving route and a second close vehicle traveling a second scheduled driving route will overlap on a roadway or at a point of interest at the same time;
when it is judged that there are two or more close vehicles, determine the driving/stopping priorities of the respective two or more close vehicles on the roadway or at the point of interest based on information relating to passengers picked up by the respective two or more close vehicles; and
send instructions to a lower priority vehicle to yield to allow a higher priority vehicle to proceed with priority to avoid interference between the first close vehicle and the second close vehicle, wherein:
the information relating to the passengers picked up by the respective two or more close vehicles is a number of passengers picked up by the respective two or more close vehicles,
the server is further configured so that the greater the number of passengers of a vehicle among the two or more close vehicles, the higher the driving/stopping priority is made, and
the server is further configured to increase the driving/stopping priority of the lower priority vehicle when the lower priority vehicle yields to higher priority vehicles a predetermined number of times.

7. A traffic control method comprising:
preparing scheduled driving routes of a plurality of vehicles controlled to be automatically driven based on current positions and destinations of the plurality of vehicles received through a communicating part configured to be able to communicate with car-mounted devices mounted in the plurality of vehicles or receiving scheduled driving routes of the plurality of vehicles through the communicating part;
judging that, among the plurality of vehicles, there are two or more close vehicles when a first close vehicle traveling a first scheduled driving route and a second close vehicle traveling a second scheduled driving route will overlap on a roadway or at a point of interest at the same time;
when it is judged that there are two or more close vehicles, determining the driving/stopping priorities of the two or more close vehicles on the roadway or at the point of interest based on information relating to passengers picked up by the respective two or more close vehicles; and
sending instructions to a lower priority vehicle to yield to allow a higher priority vehicle to proceed with priority to avoid interference between the first close vehicle and the second close vehicle,
wherein:
the information relating to the passengers picked up by the respective two or more close vehicles is a number of passengers picked up by the respective two or more close vehicles,
the greater the number of passengers of a vehicle among the two or more close vehicles, the higher the driving/stopping priority is made, and
the driving/stopping priority of the lower priority vehicle is increased when the lower priority vehicle yields to higher priority vehicles a predetermined number of times.

8. A non-transitory computer recording medium including a computer program for traffic control use for making a computer:
prepare scheduled driving routes of a plurality of vehicles controlled to be automatically driven based on current positions and destinations of the plurality of vehicles received through a communicating part configured to be able to communicate with car-mounted devices mounted in the plurality of vehicles or receive scheduled driving routes of the plurality of vehicles through the communicating part;

judge that, among the plurality of vehicles, there are two or more close vehicles when a first close vehicle traveling a first scheduled driving route and a second close vehicle traveling a second scheduled driving route will overlap on a roadway or at a point of interest at the same time;

when it is judged that there are two or more close vehicles, determine the driving/stopping priorities of the two or more close vehicles on the roadway or at the point of interest based on information relating to passengers picked up by the respective two or more close vehicles; and, send instructions to a lower priority vehicle to yield to allow a higher priority vehicle to proceed with priority to avoid interference between the first close vehicle and the second close vehicle, wherein:

the information relating to the passengers picked up by the respective two or more close vehicles is a number of passengers picked up by the respective two or more close vehicles, the greater the number of passengers of a vehicle among the two or more close vehicles, the higher the driving/stopping priority is made, and the driving/stopping priority of the lower priority vehicle is increased when the lower priority vehicle yields to higher priority vehicles a predetermined number of times.

* * * * *